United States Patent
Arora et al.

(10) Patent No.: US 7,483,080 B2
(45) Date of Patent: Jan. 27, 2009

(54) SYSTEM FOR DISPLAYING IMAGES AND METHOD THEREOF

(75) Inventors: Jitesh Arora, Thornhill (CA); Peter X. Cao, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 807 days.

(21) Appl. No.: 10/698,653

(22) Filed: Oct. 31, 2003

(65) Prior Publication Data

US 2005/0097476 A1 May 5, 2005

(51) Int. Cl.
*H04N 5/46* (2006.01)

(52) U.S. Cl. .................... 348/556; 348/553; 348/474

(58) Field of Classification Search .............. 348/445, 348/556, 558, 554, 555, 473, 474; 345/211, 345/212

See application file for complete search history.

(56) References Cited

U.S. PATENT DOCUMENTS

| | | | |
|---|---|---|---|
| 4,394,690 A * | 7/1983 | Kobayashi | 348/556 |
| 5,532,719 A * | 7/1996 | Kikinis | 345/211 |
| 5,682,529 A | 10/1997 | Hendry et al. | |
| 5,986,635 A | 11/1999 | Naka et al. | |
| 6,081,265 A | 6/2000 | Nakayama et al. | |
| 6,864,921 B2 * | 3/2005 | Kaneda et al. | 348/383 |

* cited by examiner

*Primary Examiner*—Michael Lee (57) ABSTRACT

A first set of display information is received at a device driver. The first set of display information indicates a portion of the video image to be displayed in a first window of a first monitor. An aspect ratio of the video image is determined based on the first set of display information. Based on the determined aspect ratio, the display driver determines a location on a second display device where the video image is to also be displayed.

31 Claims, 11 Drawing Sheets

SYSTEM FOR DISPLAYING IMAGES AND METHOD THEREOF

BACKGROUND

The display of video images through the use of general purpose processing platforms, such as personal computers, has proliferated as data processing capabilities have become more advanced. To facilitate the display of video images, video streams typically include information describing the image including an aspect ratio at which the video it is to be displayed. Information, such as the aspect ratio is read by a video decoder and provided to an application associated with the display of the video.

Video applications generally support the ability to modify the aspect ratio of an image. However, the rendering side of the display driver does not have access to the aspect ratio maintained by the application. Instead, the rendering side of the display driver is configured by the application with display control information, such as source an destination rectangles, to control the actual display of the image without the use of the actual aspect ratio.

The ability to display a video image on multiple display devices from a common platform has been accomplished by providing multiple sets of display control information from a specific application to one or more display drivers. Specifically, when the display of video on multiple display devices is supported, a video application provides a different set of display driver information for each display device. Because the application controls the set up of the display drivers, only source and destination video rectangles are typically provided to the device drivers to control the display of the image on both display devices. In this manner, it is known to support display of different portions of a video image on different displays by calculating and providing multiple source and destination rectangles to one or more display drivers. This support of multiple displays requires that the application be aware of each display device that is to display the image. A method and system capable of displaying video at different locations on multiple display devices using a common set of display driver data would be useful.

FIELD OF THE DISCLOSURE

The present disclosure relates generally to data processing, and more specifically to image processing.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

In accordance with a specific embodiment of the present disclosure, a first set of display information is received at a device driver. The first set of display information indicates a portion of the video image to be displayed in a first window of a first monitor. An aspect ratio of the video image is determined based on the first set of display information. Based on the determined aspect ratio, the display driver determines a location on a second display device where the video image is to also be displayed. Specific embodiments of the present disclosure can be better understood with reference to FIGS. 1 through 12 as described herein.

Figure 1:
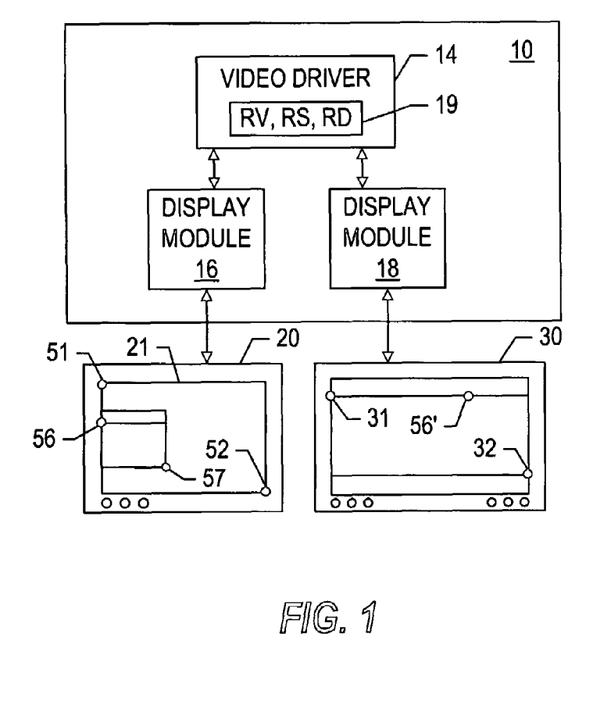
FIG. 1 is a block diagram of a system in accordance with the present disclosure.

FIG. 1 illustrates, in block diagram form, a system in accordance with the present disclosure. FIG. 1 includes a system 10 and display devices 20 and 30. System 10 can represent a data processing system such as a personal computer, a set-top box, a hand-held device, and the like. Specifically illustrated as part of system 10 is a display driver storage location 14 for storing video specific control information to be used by the display driver. Specific information stored in location 14 includes data represented by variables RNV, RS, and RD.

Variable RNV represents the rectangle of the native video image, where the native video is received from a video source such as a digital television stream, MPEG2 video file, analog to digital capture device, video cassette recorder (VCR), and/or a DVD player, to name a few. For purposes of discussion, the variable RNV represents a rectangle indicating the resolution of the native video. The native video has a native video aspect ratio based upon a resolution of the transmitted video signal.

Figure 2:
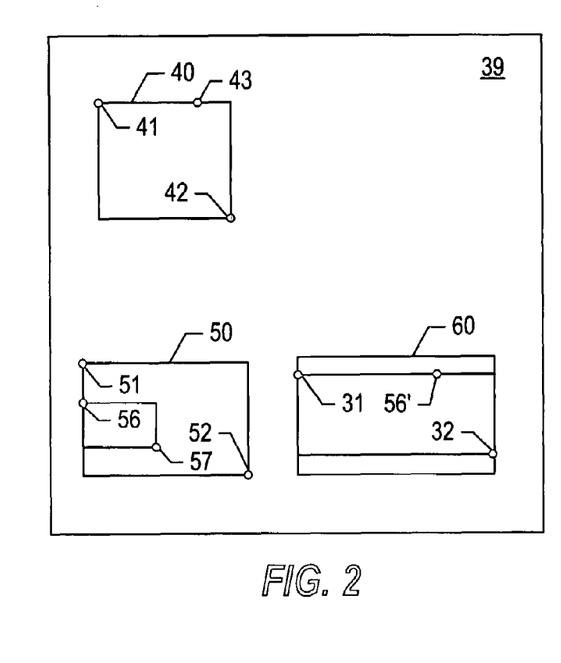
FIG. 2 is a block diagram representation of video system and overlay information in accordance with the present disclosure.

FIG. 2 illustrates in block form a representation of video information as may be stored in video memory 39. Rectangle 40 represents native video, and points 41 and 42 represent two diagonally opposed corners of the native video that define a rectangle containing the entire native video image and generally represent the variable RNV.

Variable RS indicates a portion of the native video, referred to as the source video, that is to be displayed on a display device. The variable RS defines a rectangle that indicates some or all of the native video. Referring to FIG. 2, a rectangle formed by points 42 and 43 indicate corners of a rectangle defining the location of the source video that is to displayed in the display device 20 of FIG. 1.

The location within display device 20 where the source video is to be displayed is defined by variable RD, which is the destination rectangle For purposes of discussion, display device 20 is assumed to have a resolution of 1024×768. In FIG. 2, the destination rectangle is indicated by the rectangle formed by points 56 and 57, which are illustrated to be part of a video overlay frame 50. The video overlay frame 50 is mapped to correspond to the display area of the display device 20. The fact that the video overlay frame 50 is mapped to correspond to the display area of the display device 20 is indicated by the common use of references 51 and 52 at the corners of the display portion of display device 20 and in overlay frame 50. The rectangle defined by points 56 and 57 represents where the video identified by the source video rectangle (RS), defined by points 43 and 42, is to be displayed on the display device 20. A corresponding set of points 56 and 57 are also indicated on the display device 20. In this specific example, the destination points 56 and 57 correspond to the data portion of an application window, as opposed to the title/menu bar of an application window.

The operation of DISPLAY MODULE 16 of system 10 is controlled by the variables RS and RD, which define for the DISPLAY MODULE 16 a portion of native video to be displayed, and where this portion is to be displayed. The DISPLAY MODULE 16 scales the source video as needed to fit into the destination rectangle defined by points 56 and 57. Relative to FIG. 2, it is assumed that the source video, defined by points 43 and 42, represent the right-most horizontal ⅓ of the native video image 40. It is further assumed that based on the destination rectangle (RD) that the DISPLAY MODULE 16 needs to downscale the source video defined by points 43 and 42 by 2× in the vertical dimension as a result of being fitted within the destination rectangle (RD) defined by points 56 and 57, and that a horizontal scaling of 1× has been performed.

In accordance with a specific embodiment of the present disclosure, display module 18 determines a display location for the native video image on the second display device 30 based on variables RNV, RS and RD, while preserving the aspect ratio set by an application providing the variables. For purposes of discussion, display device 30 is assumed to have a resolution of 1280×1024. It will be appreciated that the resolution of the display devices 20 and 30 may be the same or different. In the present example, if the aspect ratio of the native video is 3:2, the modified aspect ratio set by the application is 3:1, as a result of scaling based on the destination rectangle. In the present embodiment, the display location of the video on the display device 30 is defined by a rectangle with corner points 31 and 32 that allow the entire video image to be displayed at the 3:1 aspect ratio. However, instead of the points 31 and 32 being provided by the video application, the points 31 and 32 are determined at the rendering side of the driver based upon the video information RNV, RS, and RD that is associated with displaying the portion of the image on the display device 20.

The unreduced aspect ratio X:Y of the image, as currently being displayed by an application can be determined by the equation:

$$X:Y \rightarrow \{[D(x)/S(x)]*\underline{NV}(x)\}:\{[D(y)/S(y)]*NV(y)\} \quad \text{(Equation 1)}$$

where:
D(x) is the horizontal resolution or distance of the destination rectangle;
D(y) is the vertical resolution or distance of the destination rectangle;
S(x) is the horizontal resolution or distance of the source rectangle;
S(y) is the horizontal resolution or distance of the source rectangle;
NV(x) is the horizontal resolution or distance of the native video rectangle; and
NV(y) is the vertical resolution or distance of the native video rectangle.

The aspect ratio X:Y provided by Equation 1 is also a resolution at which the image can be displayed. To illustrate, TABLE 1 uses exemplary values for the points associated with the variables RNV, RS and RD of FIGS. 1 and 2 where the native video image has a resolution of 720×480 and an aspect ratio of 3:2. Column 1 contains variables of the form VARIABLE (TL, LR), where TL is the point indicating the Top Left corner of a rectangle VARIABLE, and LR is the point indicating the Lower Right corner of the rectangle VARIABLE. Column 2 indicates the x, y coordinates associated with the point TL. Column 3 indicates the x, y coordinates associated with the point LR. Coordinates are provided for variables NV, RS, and RD, from which the variables of Equation 1 are determined.

TABLE 1

| VARIABLE | TL(x, y) | LR(x, y) |
|---|---|---|
| NV(P41, P42) | 0, 0 | 720, 480 |
| S(P43, P42) | 480, 0 | 720, 480 |
| D(P56, P57) | 0, 392 | 240, 632 |

Substituting the coordinate values from TABLE 1 into equation 1 results in Equation Set 2 that solves for the modified image resolution, i.e., unreduced aspect ratio, as set by an application.

$$X:Y \rightarrow \{[D(x)/S(x)]*NV(x)\}:\{[D(y)/S(y)]*NV(y)\}$$

$$X:Y \rightarrow \{[(240-0)/(720-480)]*(720-0)\}:\{[(632-392)/(480-0)]*(480-0)\}$$

$$X:Y \rightarrow \{[(240)/(240)]*(720)\}:\{[(240)/(480)]*(480)\}$$

$$X:Y \rightarrow \{[1]*(720)\}:\{[½]*(480)\}$$

$$X:Y \rightarrow 720:240 \leftarrow \text{Aspect Ratio} \quad \text{(Equation Set 2)}$$

The aspect ratio of 720:240 reduces to an aspect ratio of 3:1. Based upon the calculated resolution, and/or aspect ratio, the image can be fitted onto the second display device. In one embodiment the scaled image is fitted to maintain a resolution of 720:240, while in another embodiment, as illustrated in FIGS. 1 and 2, the scaled image is fitted to obtain a maximum image size, or other constrained image size, on an available monitor for the calculated aspect ratio.

Figure 3:
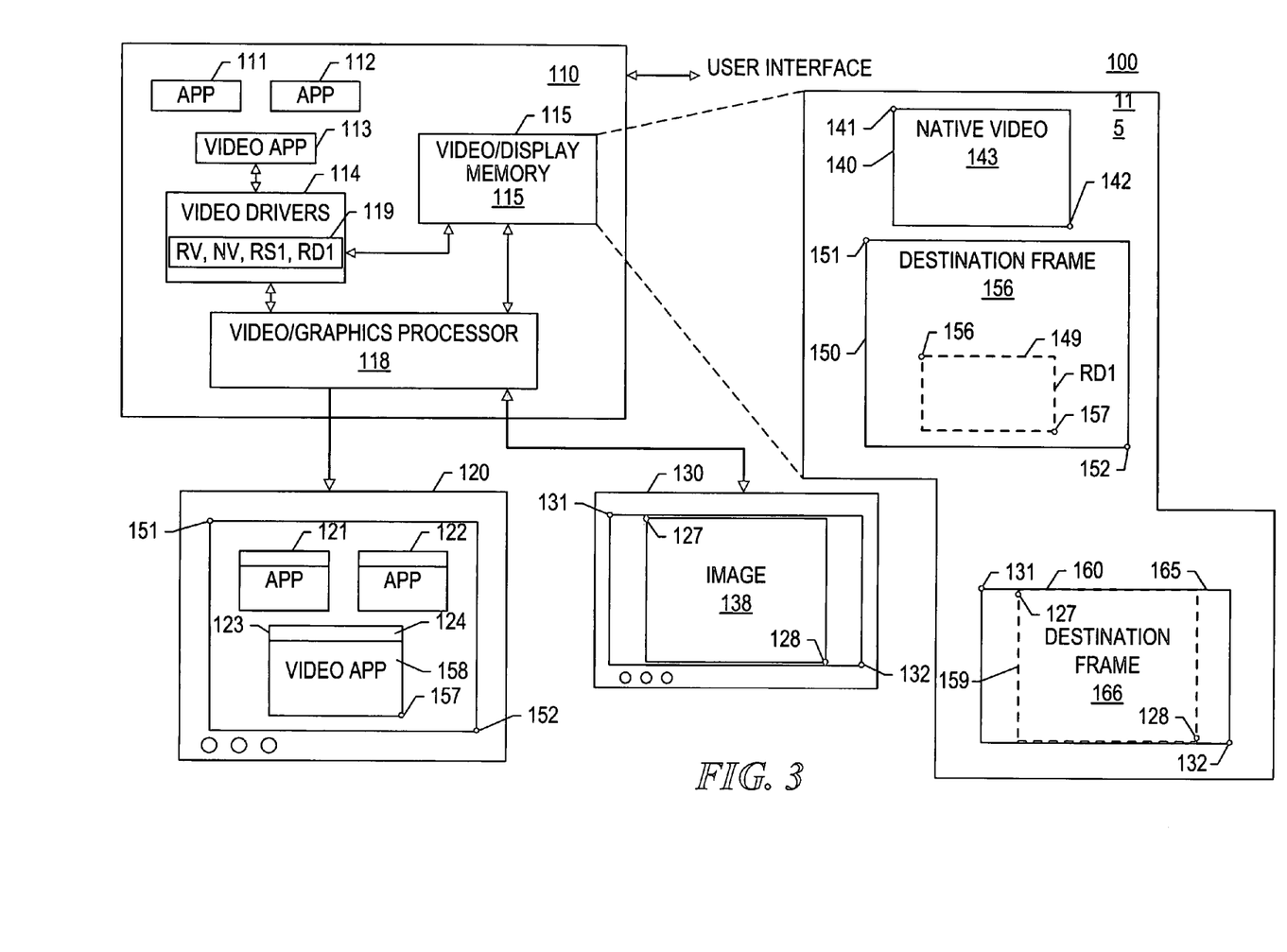
FIGS. 3-9 are block diagrams representing systems having specific overlay information in accordance with specific embodiments of the disclosure.

In the manner previously described, it is possible for an image to be provided to more than one display device with a common set of display driver information. As a result, it is not necessary for the application program that is setting the display driver information to have knowledge of the second display device. FIG. 3 illustrates an alternate embodiment of the present disclosure in greater detail.

FIG. 3 illustrates a system comprising a data processor 110, display device 120, and display device 130.

System 110 comprises an application labeled APP 111, an application labeled APP 112, an application labeled VIDEO APP 113, VIDEO DRIVERS 114, VIDEO/DISPLAY MEMORY 115, and VIDEO/GRAPHICS PROCESSOR 118.

In operation, APP 111 is an application associated with window 121 on display device 120; APP 112 is an application associated with window 122 on display device 120; VIDEO APP 113 is a video application associated with window 123 on display device 120 that controls the display of a video image within the active portion 158 of window 123 defined by points 156 and 157. For purposes of discussion, the display device 120 has a resolution of 1024×768.

VIDEO APP 113 interfaces with VIDEO DRIVERS 114, which in turn interface with the video/graphics processor 118 to control the display of video images on display device 120. As discussed with reference to FIGS. 1 and 2, the variables RNV, RS1, and RD1 are stored in a memory location for access by the driver 114, where RNV represents a rectangle defining the resolution of the native video. VIDEO DRIVERS 114 may represent one or more drives MEMORY 115 is illustrated in detail to include NATIVE VIDEO 143 defined by rectangle 140; DESTINATION FRAME 156, defined by rectangle 150, which corresponds to display device 120; and DESTINATION FRAME 166, defined by rectangle 150, corresponding to display device 130. In operation, NATIVE VIDEO 143 represents a video image as may be received and stored. The points 141 and 142 represent two diagonally opposed corners of NATIVE VIDEO 143 that define a rectangle containing the entire native video image. For the specific embodiment illustrated in FIG. 3, the source rectangle (RS1) is coincident to the entire NATIVE VIDEO 143, and therefore is also defined by points 141 and 142. DESTINATION FRAME 156 represents a frame with an overlay indicator 149 corresponding to the variable RD1 that identifies the destination for source video on the display device 120. DESTINATION FRAME 165 represents a frame with an overlay indicator 159 corresponding to a location determined by the display driver using the variables NV, RS1, and RD1. The overlay indicator 159 indicates where a scaled, or unscaled, video is to be inserted with respect to the display of display device 130. For purposes of discussion, display device 130 has a resolution of 1280×1024.

Display device 120 is illustrated displaying three separate application windows 121, 122, and 123 corresponding to applications APP 111, APP 112 and VIDEO APP 113. It will be appreciated that the application windows can overlap each other completely, partially, or not at all. Each of the application windows 121 123 are illustrated to include a title bar/control area, such as region 124 of window 123, and an active window portion, such as the region 158 of window 123 defined by the rectangle having points 156 and 157 at diagonally opposed corners. An image, based on the NATIVE VIDEO 143, is to be displayed within the active window portion of application window 123, which can be manipulated by a user to change the location and aspect ratio of the video image.

As previously described, an application, such as VIDEO APP 113, can store control information NV, RS1, and RD1 at storage location 119. Based upon this control information, the VIDEO/GRAPHICS PROCESSOR 118 accesses the native video image, and scales the video image as needed before providing the image to display device 120 for display on its monitor. In addition, using equation 1, the image can be reproduced on the display device 130 for simultaneous display. TABLE 2 and Equation Set 3 below illustrate a specific example:

TABLE 2

| Variable | UL(x, y) | LR(x, y) |
|---|---|---|
| NV(P141, P142) | 0, 0 | 720, 480 |
| S(P141, P142) | 0, 0 | 720, 480 |
| D(P156, P157) | 152, 384 | 872, 864 |

Substituting the values from TABLE 2 into Equation 1 results in the following set of equations solving for image resolution, i.e., aspect ratio, as set at an application.

$$X:Y \rightarrow \{[D(x)/S(x)]*NV(x)\}:\{[D(y)/S(y)]*NV(y)\}$$

$$X:Y \rightarrow \{[(872-152)/(720-0)]*(720-0)\}:\{[(864-384)/(480-0)]*(480-0)\}$$

$$X:Y \rightarrow \{[(720)/(720)]*(720)\}:\{[(480)/(480)]*(480)\}$$

$$X:Y \rightarrow \{720\}:\{480\} \leftarrow \text{Aspect Ratio} \quad \text{(Equation Set 3)}$$

The resolution of 720:480 reduces to an aspect ratio of 3:5, which is the same as the native video. Based upon the determined resolution, and/or aspect ratio, the image can be fitted onto the second display device 130. In one embodiment, the video is placed to maintain the actual resolution of 640:400, while in another embodiment, as illustrated in FIG. 3, the video image is fitted onto the monitor to obtain a maximum image size for the modified aspect ratio. In this manner, it is possible for an image to be provided to more than one display device using a common set of display driver information provided by an application program. As a result, it is not necessary for the application program that is setting the video driver information to have knowledge of the second display device. This is an improvement over the known art.

Figure 4:
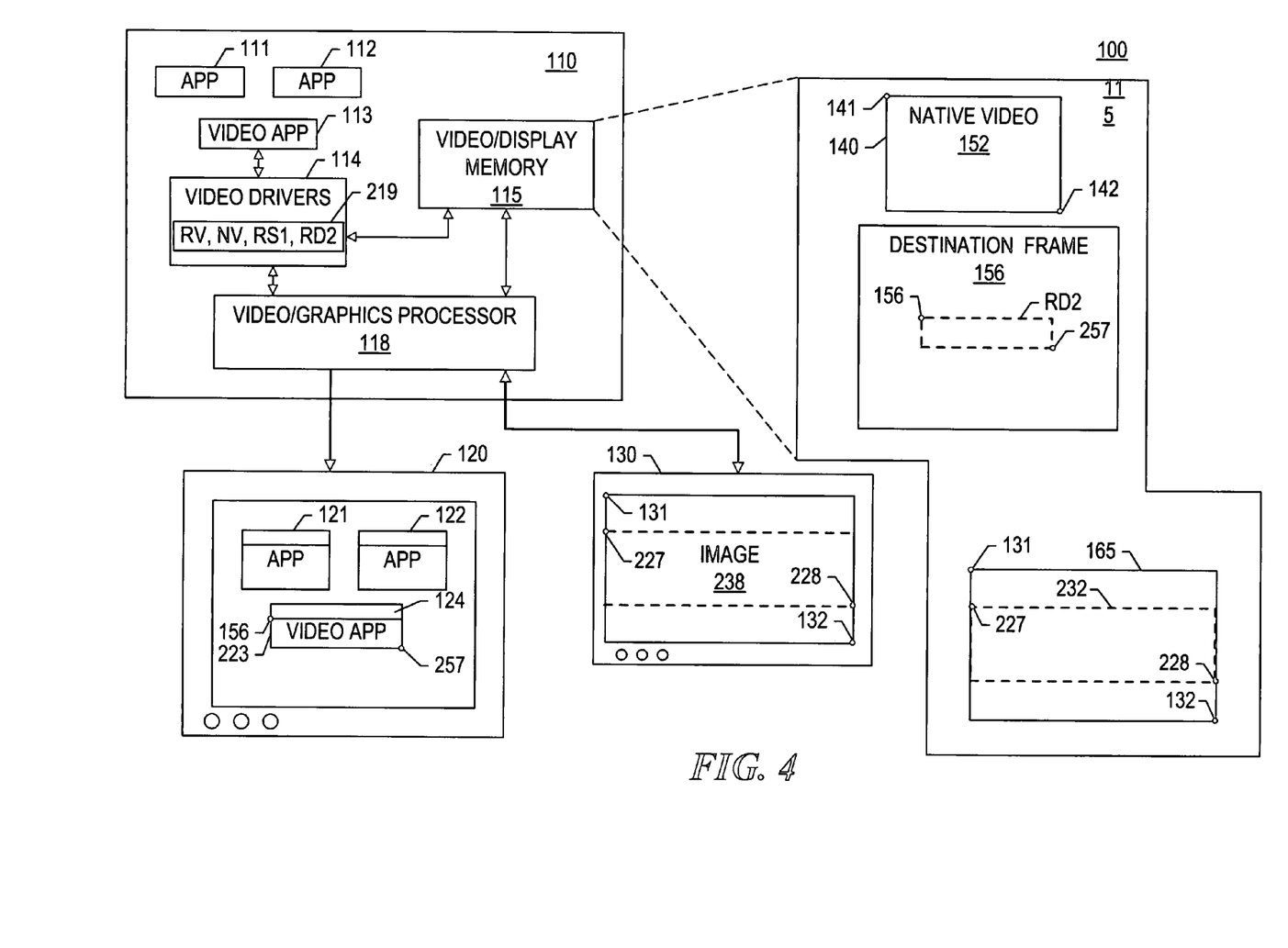

FIG. 4 illustrates an alternate embodiment of the present disclosure where the video image displayed by the VIDEO APP 113 has been modified to change the aspect ratio of the displayed image by changing the destination rectangle to RS2. Typically this is accomplished by a user interfacing with the VIDEO APP 113 through a user interface. In the illustrated example, the lower edge of the window 123 has been moved up to form a different size window 223. Window 223 now has an aspect ratio that has a larger horizontal component relative to the vertical component. Assuming that the active window portion 258 of window 223 is now ½ the vertical height of the active window portion 158 of FIG. 3, the following TABLE 3 data and Equation Set 4 determine the new resolution and aspect ratio. Reference points that have not changed have maintained the same reference numbers in TABLE 3.

TABLE 3

| Variable | UL(x, y) | LR(x, y) |
|---|---|---|
| NV(P141, P142) | 0, 0 | 720, 480 |
| S(P141, P142) | 0, 0 | 720, 480 |
| D(P156, P257) | 152, 384 | 872, 624 |

Substituting the values from TABLE 3 into Equation Set 2 results in the following set of equations solving for the aspect ratio as set at an application.

$$X:Y \rightarrow \{[D(x)/S(x)]*NV(x)\}:\{[D(y)/S(y)]*NV(y)\}$$

$$X:Y \rightarrow \{[(872-152)/(720-0)]*(720-0)\}:\{[(624-384)/(480-0)]*(480-0)\}$$

$$X:Y \rightarrow \{[(720)/(720)]*(720)\}:\{[(240)/(480)]*(480)\}$$

$$X:Y \rightarrow \{720\}:\{240\} \leftarrow \text{Aspect Ratio} \quad \text{(Equation Set 2)}$$

The aspect ratio of 720:240 reduces to an aspect ratio of 3:1. Based upon the determined resolution, and/or aspect ratio, the image can be fitted onto the second display device. In one embodiment the scaled image is positioned to maintain a resolution of 720:240, while in another embodiment, as illustrated in FIG. 3, an image is fitted to obtain a maximum image size on an available monitor for the determined aspect ratio. In this manner, it is possible for an image to be displayed on more than one display device using a common set of display driver information. As a result, it is not necessary for the application program that is setting the video driver information to have knowledge of the second display device.

Figure 5:
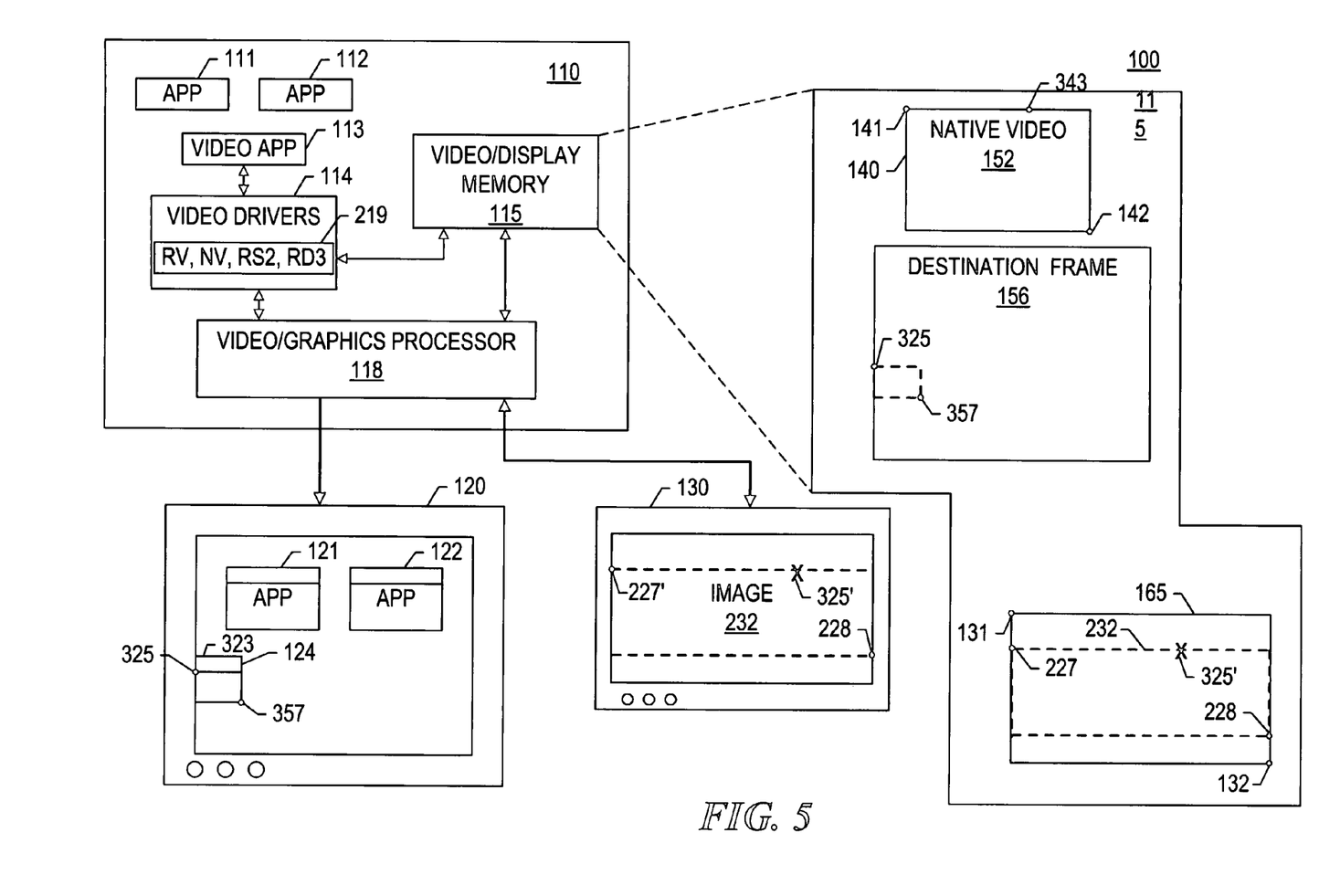

FIG. 5 illustrates an alternate embodiment of the present disclosure where the video image of FIG. 4, displayed by the VIDEO APP 113, has been modified by being shifted partially off screen, without changing the aspect ratio. This is accomplished by changing the source and destination rectangles to RS2 and RD3. Typically such a shift will be accomplished by a user interfacing with the VIDEO APP 113 through a user interface. In the illustrated example, the left edge of the window 123 has been moved off screen to form new window 323 whereby a horizontal portion of the video is shifted past the vertical edge of the monitor (e.g., at least one column width of pixels is shifted off screen). Assuming that ⅗ of the active window portion 358 of window 223 is now off screen in FIG. 5, the following TABLE 4 and Equation Set 5 determine the new aspect ratio.

TABLE 4

| Variable | UL(x, y) | LR(x, y) |
|---|---|---|
| NV(P141, P142) | 0, 0 | 720, 480 |
| S(P343, P142) | 432, 0 | 720, 480 |
| D(P325, P357) | 0, 384 | 288, 624 |

Substituting the values from TABLE 4 into Equation Set 1 results in the following:

$$X{:}Y \rightarrow \{[D(x)/S(x)]*NV(x)\}{:}\{[D(y)/S(y)]*NV(y)\}$$

$$X{:}Y \rightarrow \{[(288-0)/(720-432)]*(720-0)\}{:}\{[(624-384)/(480-0)]*(480-0)\}$$

$$X{:}Y \rightarrow \{[(288)/(288)]*(720)\}{:}\{[(240)/(480)]*(480)\}$$

$$X{:}Y \rightarrow \{720\}{:}\{240\} \leftarrow \text{Aspect Ratio} \qquad \text{(Equation Set 3)}$$

The resolution of 720:240 reduces to an aspect ratio of 3:1, which is the same as determined with respect to FIG. 4. Calculating an accurate resolution and aspect ratio when a portion of the image is off screen represents an improvement over previous methods. This illustrates that Equation 1 allows for the resolution and aspect ratio of the video image to be determined even when only a partial image is displayed onscreen.

Figure 6:
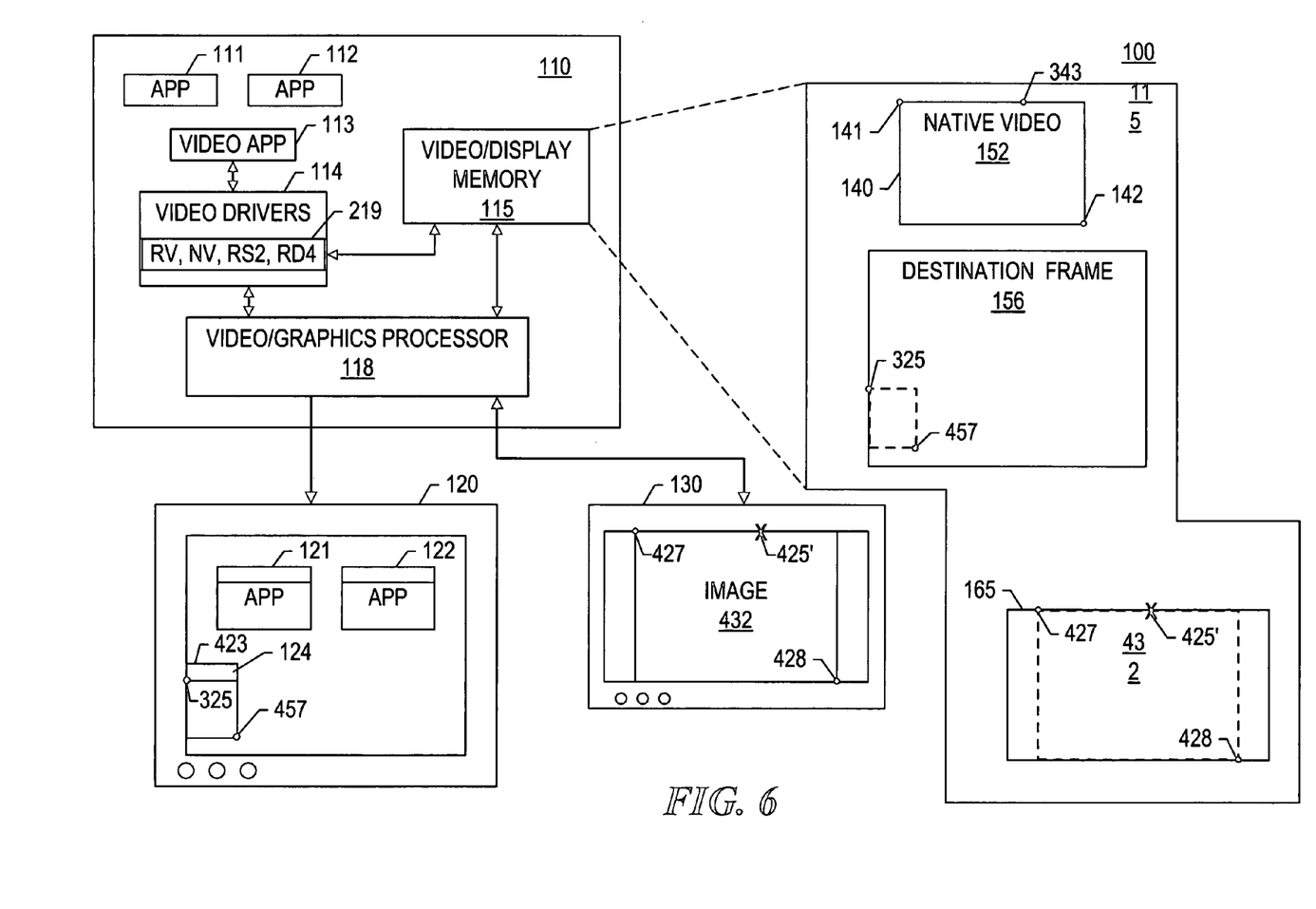

FIG. 6 illustrates an alternate embodiment of the present disclosure where the video image of FIG. 5, displayed by the VIDEO APP 113, has been modified by having its aspect ratio changed by expanding the active portion of window 323, FIG. 5, while a portion of the image is offscreen, to obtain window 423 in FIG. 6. This has been accomplished by changing the destination rectangle to RD4. Typically such a change in aspect ratio will be accomplished by a user interfacing with the VIDEO APP 113 through a user interface. In the illustrated example, the left edge of the window 123 continues to be offscreen. Assuming that active portion 458 of window 323 has been expanded by 2× in the vertical direction, the following table and equations determine the new resolution and aspect ratio.

TABLE 5

| Variable | LL(x, y) | UR(x, y) |
|---|---|---|
| NV(P141, P142) | 0, 0 | 720, 480 |
| S(P343, P142) | 432, 0 | 720, 480 |
| D(P425, P357) | 0, 384 | 288, 864 |

Substituting the values from TABLE 5 into Equation 1 results in the following set of equations solving for the aspect ratio, as set at an application.

$$X{:}Y \rightarrow \{[D(x)/S(x)]*NV(x)\}{:}\{[D(y)/S(y)]*NV(y)\}$$

$$X{:}Y \rightarrow \{[(288-0)/(720-432)]*(720-0)\}{:}\{[(864-384)/(480-0)]*(480-0)\}$$

$$X{:}Y \rightarrow \{[(288)/(288)]*(720)\}{:}\{[(480)/(480)]*(480)\}$$

$$X{:}Y \rightarrow \{720\}{:}\{480\} \leftarrow \text{Aspect Ratio} \qquad \text{(Equation Set 2)}$$

The resolution of 720:480 reduces to an aspect ratio of 3:2. This illustrates that Equation 1 allows for the resolution and aspect ratio of the video image to be changed offscreen and still determine the aspect ratio.

Figure 7:
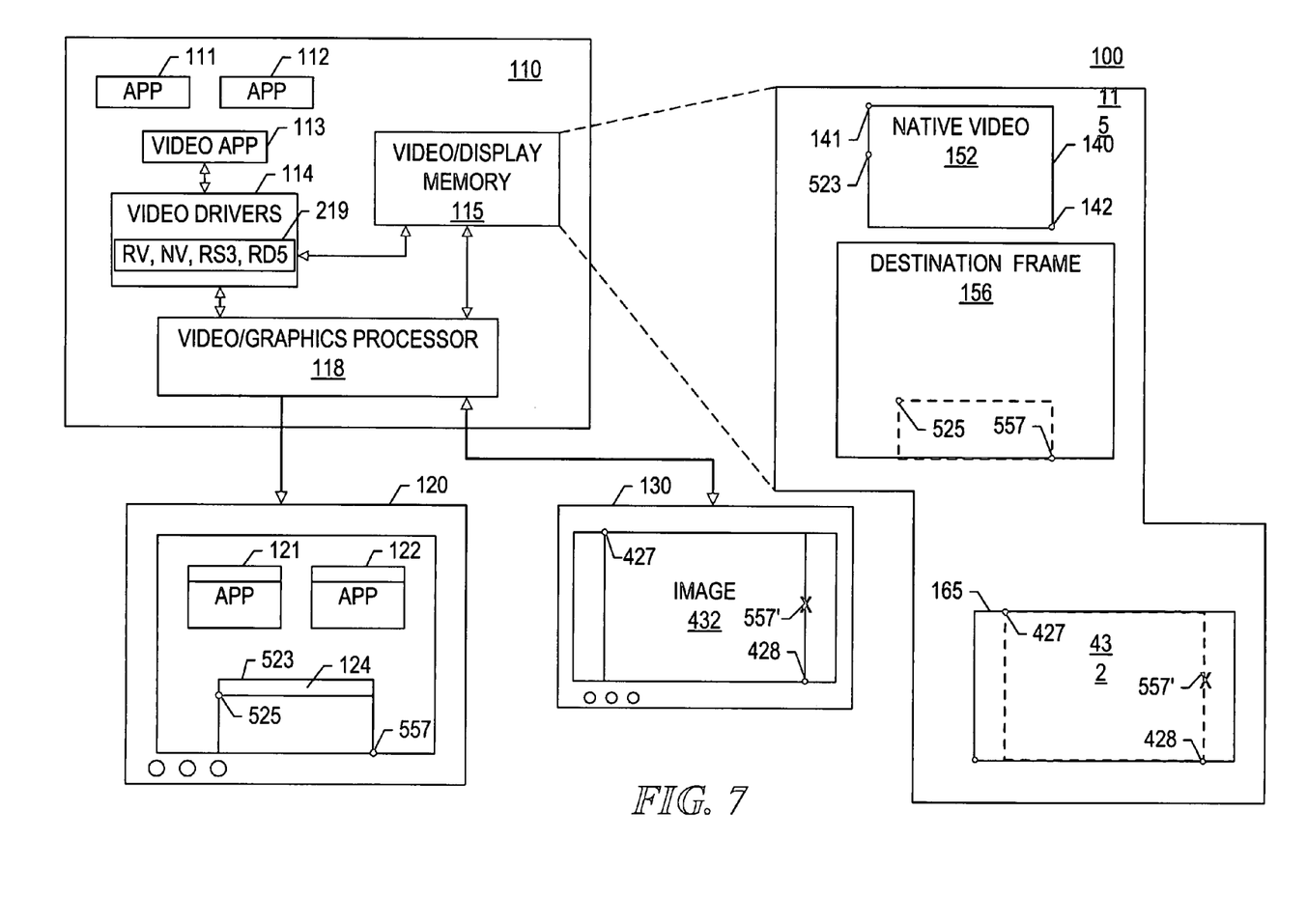
Figure 8:
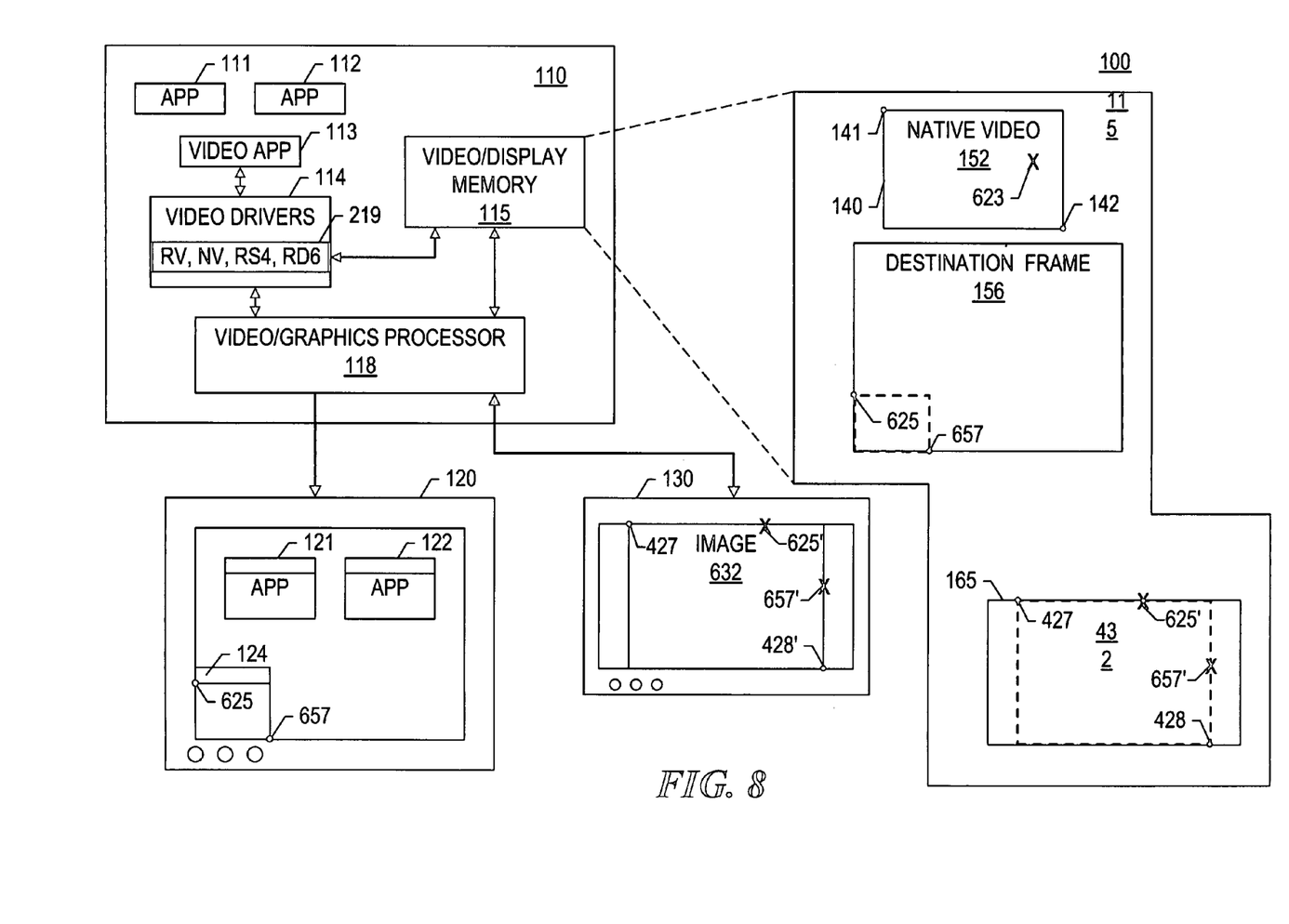
Figure 9:
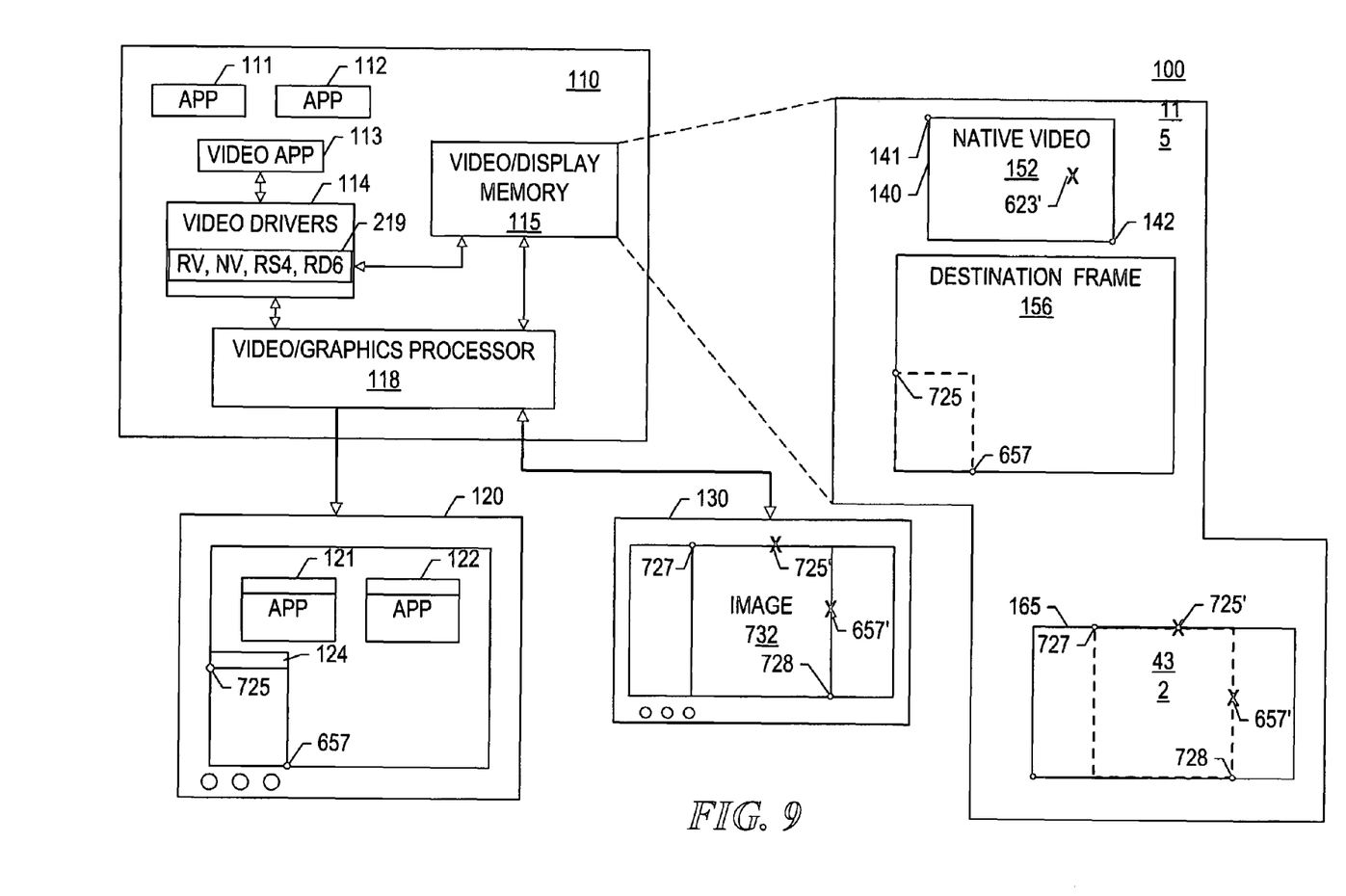

FIG. 7 illustrates a specific embodiment, where the video window is partially off the bottom of the screen resulting in a vertical portion of the video being shifted offscreen, i.e., clipped by a horizontal edge of the display device 120. FIG. 8 illustrates a specific embodiment where the window is shifted to be partially off-screen in both a vertical and a horizontal direction. FIG. 9 illustrates a specific embodiment where the image of FIG. 8 has its aspect ratio modified while partially off-screen. In each of these embodiments, Equation 1 can be used to determine the appropriate resolution and/or aspect ratio of the image as scaled by the VIDEO APP 113 for display on a separate monitor without the knowledge and/or intervention of the video application.

Figure 10:
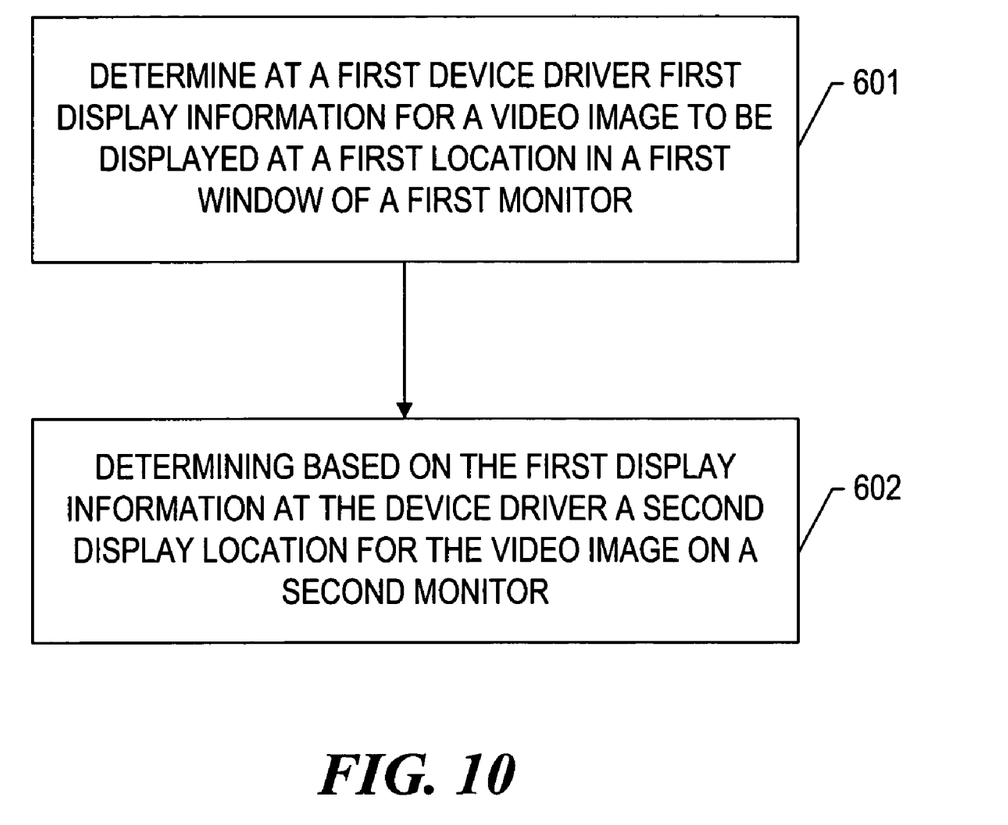
FIGS. 10 and 11 are flow diagrams representing methods in accordance with specific embodiments of the present disclosure.

FIG. 10 illustrates, in flow diagram form, a method in accordance with the present disclosure. At step 601, a device driver determines display information for a video image to be displayed in a first window of first monitor. The device driver can determine the display information by receiving the information from an application, or by accessing the information from a storage location.

At step 602, the display information is used to determine at the device driver a display location for the video image on a second monitor. For example, with respect to FIG. 1, a video image is displayed in window 21 between points 56 and 57 on monitor 20, and the same video image content is displayed on the monitor 30 between points 56' and 32. As described with respect to FIG. 2, the video image may be a portion of an available image, such as the image on display device 120 of FIG. 7 between points 525 and 557 and the corresponding image between points 427 and 557' on DEVICE 130. The method of FIG. 10 allows for a display driver to support multiple display devices without the knowledge of the overlying application program. As illustrated in FIG. 1, one embodiment allows the video from the video application to be displayed on a separate monitor independent of the application window.

Figure 11:
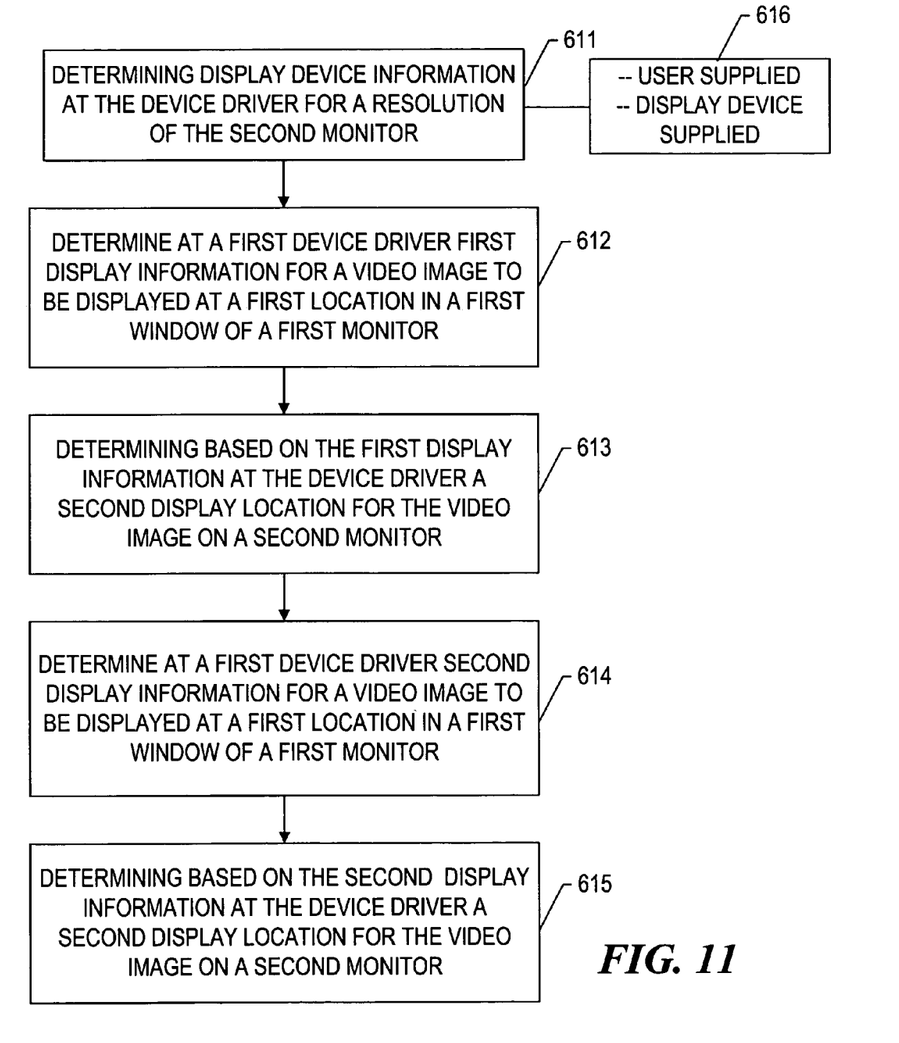

FIG. 11 illustrates, in flow diagram form, a method in accordance with the present disclosure. At step 611, a resolution for a second monitor is determined. As indicated in block 616, the resolution of the second monitor can be received at the device driver, or by a query to the device driver which would then supply the information. In one embodiment, it would be consistent for an overlying application program to assist in determining the resolution of the second monitor. In an alternate embodiment, the resolution of the second monitor would be determined without knowledge and/or intervention of an overlying application program.

At step 612, the device driver determines a first display information for the video image to be displayed at a first location within an application window of the first monitor. One way that the device driver can determine the first display information is to receive the information from an application, or access the information from a storage location.

At step 613, the first display information and the resolution of the second monitor are used by the device driver to determine a second display location for the video image on a second monitor. For example, with respect to FIG. 1, a video image is displayed in a window 21, on monitor 20, at a first location between points 56 and 57; and the same video image is displayed on the monitor of display device 30 at a second location between points 56' and 32. Note that the video image is not necessarily displayed at the same resolution on the display devices 20 and 30.

At step 614, the display driver determines a second display information for the video image, which is to be displayed at a third location of the first monitor. The second display information will typically represent new video display information received at the display driver from a video application concerning the image to be displayed, such as different source and destination rectangles stored in MEMORY 114 as illustrated in FIGS. 3-4.

At step 615, the second display information and the resolution of the second monitor are used by the device driver to determine a new display location for the video image on a second monitor. For example, if the second display information results in a new aspect ratio being detected, it will be represented in the new display location on the second monitor.

Figure 12:
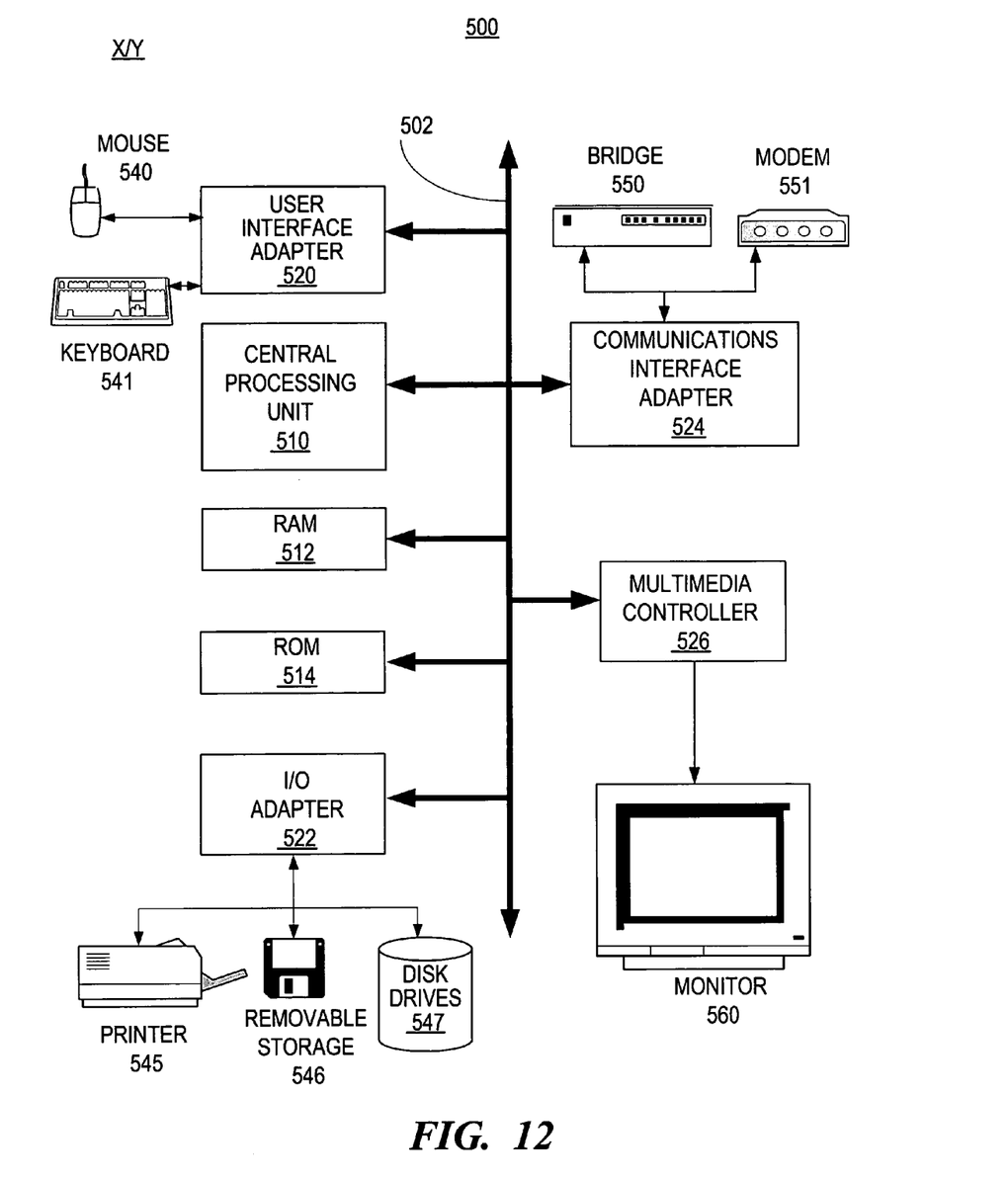
FIG. 12 represents, in block diagram form, a system in accordance with the present disclosure.

FIG. 12 illustrates, in block diagram form, a PROCESSING DEVICE 500 that may represent a data processing system, such as a personal computer system. The PROCESSING DEVICE 500 is illustrated to include a CENTRAL PROCESSING UNIT 510, which may be a conventional proprietary data processor; memory, including RANDOM ACCESS MEMORY 512, READ ONLY MEMORY 514; INPUT OUTPUT ADAPTER 522; a USER INTERFACE ADAPTER 520; a COMMUNICATIONS INTERFACE ADAPTER 524; and a MULTIMEDIA CONTROLLER 526.

The applications and drivers discussed herein will typically be stored in one or more of the illustrated memories and executed by the CENTRAL PROCESSING UNIT 510.

The INPUT OUTPUT (I/O) ADAPTER 522 is further connected to, and controls, DISK DRIVES 547, PRINTER 545, REMOVABLE STORAGE DEVICES 546, as well as other standard and proprietary I/O devices.

The USER INTERFACE ADAPTER 520 can be considered to be a specialized I/O adapter. The adapter 520 is illustrated to be connected to a mouse 540, and a keyboard 541. In addition, the user INTERFACE ADAPTER 520 may be connected to other devices capable of providing various types of user control, such as touch screen devices.

The COMMUNICATIONS INTERFACE ADAPTER 524 is connected to a bridge 550 such as is associated with a local or a wide area network, and a modem 551. By connecting the SYSTEM BUS 502 to various communication devices, external access to information can be obtained.

The MULTIMEDIA CONTROLLER 526 will generally include a video graphics controller, such as the type described herein, capable of displaying images upon the monitor 560, which may represent multiple monitors, as well as providing audio to external components (not illustrated).

Generally, the SYSTEM 500 will be capable of implementing the system and methods described herein.

The above disclosed subject matter is to be considered illustrative and the appended claims are intended to cover all such modifications and other embodiments which fall within the true spirit and scope of the present invention. Other embodiments, variations and enhancements are anticipated, for example, it will be appreciated that a single display driver can be used to control the multiple displays described. In other embodiment, multiple display drivers can be used. Likewise, the technique used herein can be used to display video on more that two monitors. Thus, to the maximum extent allowed by law, the scope of the present invention is to be determined by the broadest possible interpretation of the following claims and their equivalents, and shall not be restricted or limited by the foregoing detailed description.

What is claimed is:

1. A method comprising:
   receiving, at a device driver, a first display information for a video image, the first display information indicating a portion of the video image to be displayed in a window of a monitor; and
   determining a first aspect ratio of the video image based on the first display information at the device driver.

2. The method of claim 1 further comprising:
   determining a first display location for the video image on a second monitor, the first display location having approximately the first aspect ratio.

3. The method of claim 1, wherein receiving the first display information comprises receiving a destination rectangle associated with the first window.

4. The method of claim 3, wherein receiving the first display information comprises receiving a source display rectangle.

5. The method of claim 4, further comprising:
   determining a portion of the video image that is to be clipped by an edge of the first monitor.

6. The method of claim 5, wherein the portion of the video image that is to be clipped is at least one selected from a group consisting of: a vertical portion of the destination rectangle and a horizontal portion of the destination rectangle.

7. The method of claim 1 further comprising:
   determining a first display location for the video image on a second monitor, the first display location having approximately the first aspect ratio;
   receiving at the device driver display device information for a resolution of the second monitor; and
   wherein determining the first display location of the second monitor further comprises determining the first display location based on the display device information.

8. The method of claim 7, wherein receiving display device information includes receiving the display device information based upon at least one selected from a group consisting of: user supplied information; a resolution of the first monitor; and information received from the second monitor.

9. The method of claim 1, wherein the window is one of a plurality of application windows of the first monitor to be simultaneously displayed.

10. The method of claim 9 further comprising:
    receiving at the device driver a second display information to replace the first display information; and
    determining a second aspect ratio based on the second display information.

11. The method of claim 10 further comprising:
    determining a second display location for the video image on the second monitor, the second display location having approximately the second aspect ratio.

12. The method of claim 2 further comprising:
    providing the portion of the video image for display in the window; and
    providing the video image for display at the first display location.

13. A method comprising:
    determining, at a device driver, a first aspect ratio of a video image to be at least partially displayed in a window of a first monitor; and
    determining, based on the first aspect ratio, a first display location of a second monitor for the video image.

14. The method of claim 13, wherein determining the first aspect ratio comprises determining the first aspect ratio based on at least one selected from a group consisting of: a destination display rectangle associated with the window and a source display rectangle.

15. The method of claim 14, wherein determining the first aspect ratio comprises determining the first aspect ratio when a portion of the video image to be at least partially displayed in the first window is clipped by an edge of the first monitor, the edge comprising at least one selected from a group consisting of a vertical edge and a horizontal edge.

16. The method of claim 13 further comprising:
determining, at the device driver, a second aspect ratio of the second monitor; and wherein determining the first display location of the second monitor comprises
determining the first display location based on the first aspect ratio and the second aspect ratio of the second monitor.

17. The method of claim 16, wherein determining the second aspect ratio of the second monitor comprises determining the second aspect ratio based upon at least one selected from a group consisting of: user supplied information; a resolution of the first monitor; and information received from the second monitor.

18. The method of claim 13, wherein the video image is displayed in a first window of a plurality of windows.

19. The method of claim 13 further comprising:
determining at the device driver, that a third aspect ratio has replaced the first aspect ratio; and
determining, based on the third aspect ratio, a second display location of the second monitor to replace the first display location.

20. The method of claim 13 further comprising:
displaying at least a first portion of the video image in the window; and
displaying substantially all the video image at the first display location.

21. A system comprising:
a first module to access a first information in a device driver to determine a display area of a video image to be displayed in a window of a first monitor; and
a second module to determine, based on the first information, a display location of a second monitor for the video image.

22. A system comprising:
a first module to determine a first aspect ratio of a video image to be displayed in a window of a first monitor; and
a second module to determine, based on the first aspect ratio, a display location of a second monitor for the video image.

23. The system of claim 22, wherein the first module is to determine the first aspect ratio based on at least one selected from a group consisting of: a destination display rectangle associated with the window and a source display rectangle.

24. The system of claim 22, wherein the first module is to determine the first aspect ratio when a portion of the video image to be at least partially displayed in the window is clipped by an edge of the first monitor, the edge comprising at least one selected from a group consisting of: a vertical edge and a horizontal edge.

25. The system of claim 22, further comprising:
a device driver to determine a second aspect ratio of the second monitor; and
wherein the second module is to determine the display location of the second monitor based on the first aspect ratio and the second aspect ratio.

26. The system of claim 25, wherein the device deriver is to determine the second aspect ratio based upon at least one selected from a group consisting of: user supplied information; a resolution of the first monitor; and information received from the second monitor.

27. The system of claim 22, further comprising:
a video processor to provide at least a first portion of the video image for display in the window of the first monitor and to provide substantially all of the video image for display at the display location of the second monitor.

28. The system of claim 21, wherein:
the first module further is to determine a first aspect ratio of the video image based on the first information; and
the second module is to determine the first display location of the second monitor having a second aspect ratio approximately equal to the first aspect ratio.

29. The system of claim 21, further comprising:
a device driver to receive second information for a resolution of the second monitor; and
wherein the second module is to determine the display location of the second monitor based on the second information.

30. The system of claim 29, wherein the device driver is configured to receive the second information based upon at least one selected from a group consisting of: user supplied information; a resolution of the first monitor; and information received from the second monitor.

31. The system of claim 21, further comprising:
a video processor to provide at least a portion of the video image for display in the window of the first monitor and to provide substantially all of the video image for display at the display location of the second monitor.

* * * * *

UNITED STATES PATENT AND TRADEMARK OFFICE
CERTIFICATE OF CORRECTION

PATENT NO.        : 7,483,080 B2  
APPLICATION NO. : 10/698653  
DATED             : January 27, 2009  
INVENTOR(S)       : Jitesh Arora et al.

It is certified that error appears in the above-identified patent and that said Letters Patent is hereby corrected as shown below:

Column 10, Line 6, please change "of a monitor" to --of a first monitor--  
Column 10, Line 43, please change "The method of claim 9" to --The method of claim 7--

Signed and Sealed this

Twenty-ninth Day of September, 2009

David J. Kappos  
*Director of the United States Patent and Trademark Office*